(12) United States Patent
Kienzle et al.

(10) Patent No.: US 7,934,257 B1
(45) Date of Patent: Apr. 26, 2011

(54) ON-BOX ACTIVE RECONNAISSANCE

(75) Inventors: Darrell Kienzle, Vienna, VA (US); Paul Swinton, Alexandria, VA (US)

(73) Assignee: Symantec Corporation, Cupertino, CA (US)

( * ) Notice: Subject to any disclaimer, the term of this patent is extended or adjusted under 35 U.S.C. 154(b) by 1873 days.

(21) Appl. No.: 11/030,139

(22) Filed: Jan. 7, 2005

(51) Int. Cl.
*H04L 29/14* (2006.01)

(52) U.S. Cl. ............... 726/23; 726/22; 726/25; 709/224

(58) Field of Classification Search ............. 726/22–25, 726/11–12, 16; 713/153–155
See application file for complete search history.

(56) References Cited

U.S. PATENT DOCUMENTS

| | | | |
|---|---|---|---|
| 7,403,882 B2 * | 7/2008 | Lan ................................. 703/6 |
| 2002/0073195 A1 * | 6/2002 | Hellerstein et al. ............ 709/224 |
| 2002/0178383 A1 * | 11/2002 | Hrabik et al. ................. 713/201 |
| 2004/0064731 A1 * | 4/2004 | Nguyen et al. ................. 713/201 |
| 2004/0260945 A1 * | 12/2004 | Raikar et al. .................. 713/201 |
| 2005/0160280 A1 * | 7/2005 | Caslin et al. .................... 713/189 |
| 2005/0183143 A1 * | 8/2005 | Anderholm et al. ............. 726/22 |
| 2005/0235356 A1 * | 10/2005 | Wang ............................... 726/22 |
| 2005/0289219 A1 * | 12/2005 | Nazzal ........................... 709/203 |

* cited by examiner

*Primary Examiner* — Minh Dinh
*Assistant Examiner* — Venkat Perungavoor
(74) *Attorney, Agent, or Firm* — Finnegan, Henderson, Farabow, Garrett & Dunner, LLP

(57) ABSTRACT

A method of monitoring events in a network associated with a node. An agent collects event information associated with the monitored activities, based on a set of collection rules. A determination is made whether a portion of the collected event information complies or potentially complies with one of a set of patterns. An agent selects event information from the collection based on the determination, and makes the selected event information available to a manager associated with the node and other nodes in the network. The agent manager receives event information from a plurality of agents. A triggering event is identified, as a function of the set of patterns, based on the event information. The agent manager sends at least one request to a selected set of the agents for additional event information when a triggering event is identified.

9 Claims, 7 Drawing Sheets

ON-BOX ACTIVE RECONNAISSANCE

FIELD OF THE INVENTION

This invention generally relates to security event correlation for computer systems and, more specifically, to a method for compiling event information in a distributed system.

BACKGROUND OF THE INVENTION

Existing security event correlation systems collect data from a number of distributed security agents into a central server where the data is correlated. As the amount of data collected increases, the burden on the system can become excessive. The burden can consume network bandwidth in communicating events to the central server, burden the central server processor with correlating all of the events, and increase disk or memory storage burden on the central server from storing all the events.

Generally, methods to resolve overloading of correlation systems include filtering, aggregating, or otherwise preprocessing events at the distributed agents. By preprocessing data at the agent, the total number of events that must be centrally correlated can be reduced to a manageable level. However, any such preprocessing introduces the possibility that valuable information will be removed at the agents and not be available for accurate correlation at the central server. Additionally, correlation rules being enforced at the central server take any such preprocessing into account, and may have to be manually modified if the agent preprocessing is reconfigured.

Thus, it is advantageous to allow correlation rules for a central server to accommodate distributed architecture, without modifying the rules. Further, it is advantageous to allow individual agents to store events locally and initially report only the most significant events, to reduce the consumption of network bandwidth. It is then possible to store all potentially supporting data in a distributed fashion, to be retrieved as needed. For example, such an approach would allow the vast majority of common firewall events to not be reported—only those that are needed to corroborate an attack detected by an intrusion detection system would ever be retrieved.

SUMMARY OF THE INVENTION

In accordance with one aspect of the present invention, a computer-implemented method of monitoring events in a network comprises monitoring activities associated with a node, collecting event information associated with the monitored activities and based on a set of collection rules, determining whether a portion of the collected event information complies or potentially complies with one of a set of patterns, selecting event information from the collection based on the determination, and making the selected event information available to a manager associated with the node and other nodes in the network.

In accordance with another aspect of the present invention, a computer-implemented method of monitoring events in a network comprises providing a set of patterns for examining event information, receiving event information from a plurality of agents, identifying, as a function of the set of patterns, a triggering event based on the received event information, and sending at least one request to a selected set of the agents for additional event information when a triggering event is identified.

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Figure 1:
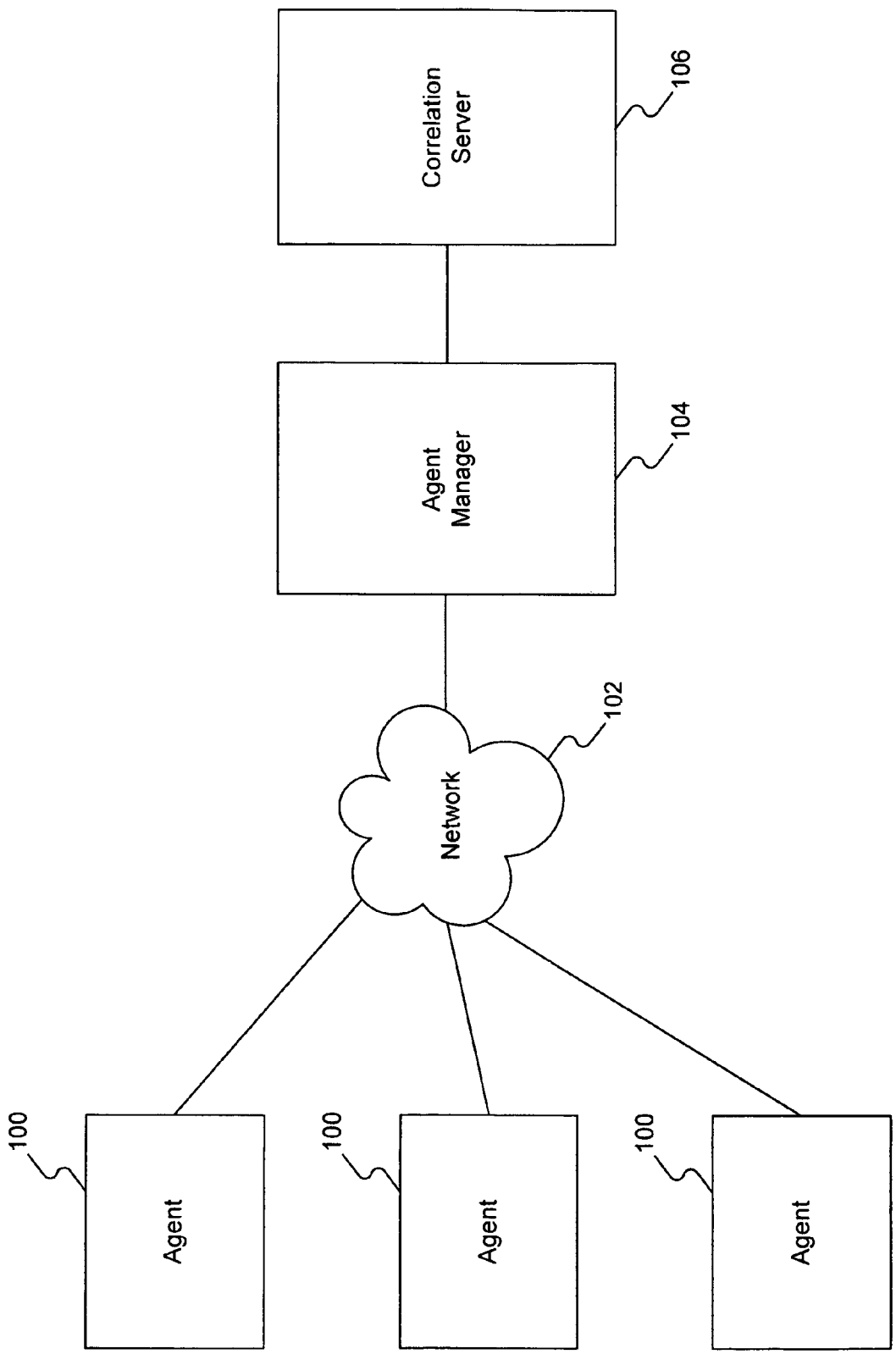
FIG. 1 is a diagram of the components in a security event correlation system that can be used in an implementation of the present invention.

Reference will now be made in detail to the present embodiment of the invention, an example of which is illustrated in the accompanying drawings. Wherever possible, the same reference numbers will be used throughout the drawings to refer to the same or like parts.

Event correlation systems need to be able to report when a combination of related events are observed. The events may include a shutdown of a client system, a firewall connection alert, or a network attack. However, other events could also be reported and the present invention is not limited to the type of events described.

Often, an event, such as a firewall connection alert, may occur extremely frequently. While some small fraction of these events may be significant, it places a significant burden on the network and the correlation server to centrally analyze every occurrence of that event. The burden on the system can be significantly alleviated by instructing an agent on a machine to temporarily store these potentially important events locally, and by only requesting that data when it is needed to complete a pattern of interest, when a more significant event is seen.

Conjunctive correlation patterns (such as $event_1$, $event_2$, and ... $event_n$) can be divided into those elements that are rare and those that are relatively common. The system can defer analyzing common data and watch for only rare events that can complete the pattern. When the rare event occurs, then the system can look for more common pieces of data to finish the pattern. In one embodiment, the system can look for more common pieces of data either in the recent past or the near future. This approach allows the system to reduce the number of events that must be handled and reported over the network. For example, in accordance with one implementation, the rare events are one tenth as common as the other events, the normal operating load can be reduced by as much as 90%.

In accordance with one aspect of the invention, an event correlation system monitors, stores, reports, and analyzes events. The event correlation system contains many distributed agents, a central correlation server, and an agent manager. The agents each monitor one or more security devices and report the observed events in a device-independent form. Each agent locally stores information reflecting all or part of the aspects of events. The agent may store information, such as rotating backlogs of events, in short term memory.

In accordance with another aspect of the invention, a determination is made for a least likely event. The agent manager determines which of the events is the least likely to occur. In one embodiment, a user can identify the least likely event with a user interface. In another embodiment, the system can use stored heuristics to anticipate the least likely event. In yet another embodiment, the system can query a collection of historical data to determine which event has been the least common event so far. The least likely event is designated to be the triggering event. The other events are identified as supporting events.

Additionally, the agent manager collects the data and looks for patterns in the events as the data is received. The patterns can include: event of type A and event of type B; event of type A followed by event of type B; or more than n distinct events of type A, where the criteria for "distinct" is selectable.

Another aspect of the invention includes collection rules. Based on the collection rules, the agents are configured to discard certain events and report others. Additionally, the agent manager may adjust the collection rules. The agent manager may also request specific data from the agents. The agent manager observes the events delivered to the central server, and uses that information to adjust the collection rules or query the agents. The agent manager may instruct the agents to discard certain events, report other events, or aggregate similar, identical, or other events.

FIG. 1 illustrates a system architecture in which systems and methods consistent with the invention may be implemented. Methods consistent with the invention, as set forth in the following discussion, may be performed by instructions included in a computer-readable medium. One or more agents 100, an agent manager 104, and a correlation server 106, are connected in a network configuration represented by the network cloud 102. The agent manager communicates with a correlation server 106. The composition and protocol of the network configuration represented in FIG. 1 is not important as long as it allows for communication of information between agents 100 and an agent manager 104. In addition, the use of three agents is just for illustration and does not limit the present invention to the use of a particular number of agents.

Figure 2:
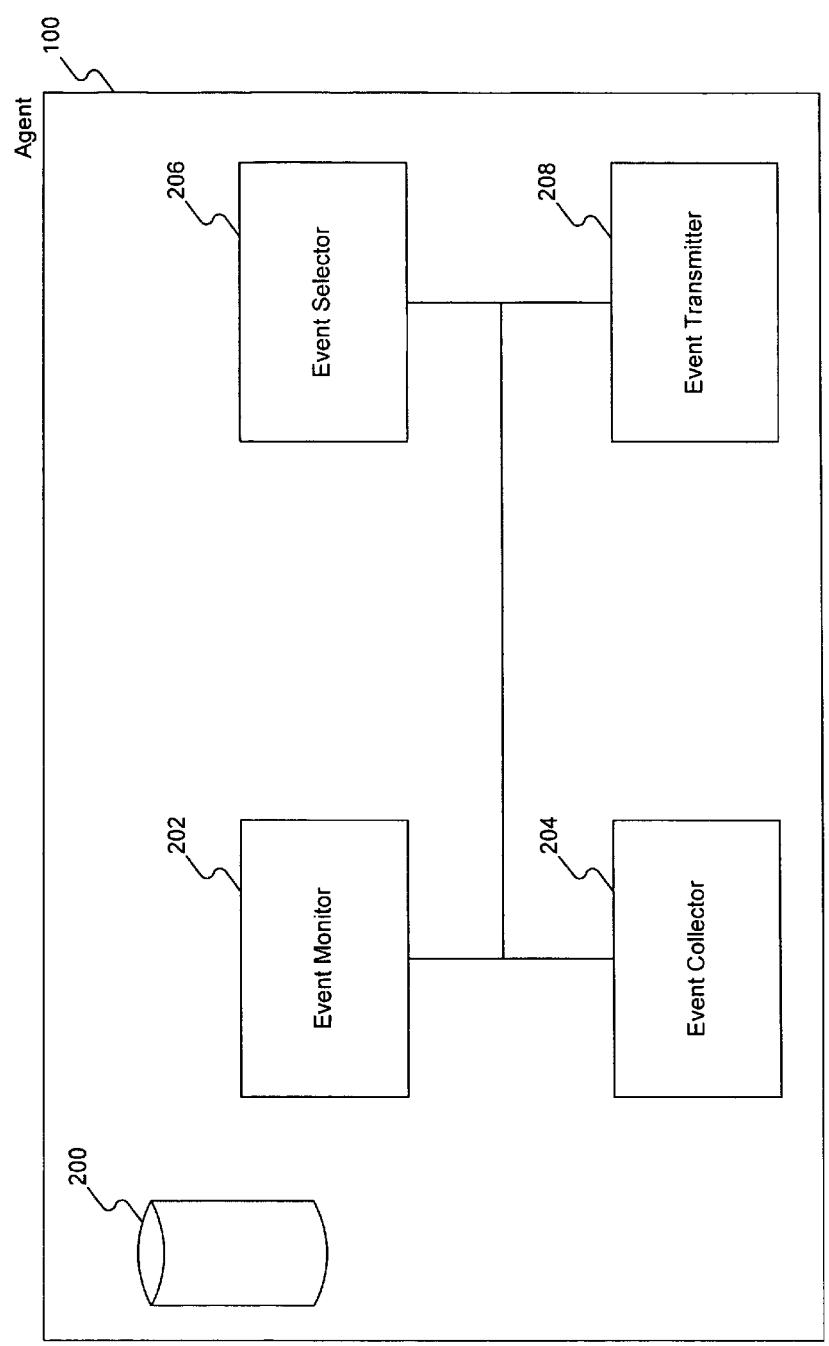
FIG. 2 is a diagram of an agent component within a security event correlation system according to the implementation of the present invention.

FIG. 2 is a diagram of the components of an agent 100 according to an implementation of the present invention. An agent 100 may include an event database 200, an event monitor 202, and event collector 204, an event selector 206, and an event transmitter 208. The event monitor 202 monitors one or more security devices and the event collector 204 is configured to collect certain monitored events. The event selector 206 is configured to determine which events to report, and the event transmitter 208 sends the selected events to the agent manager.

In one embodiment, an event database 200 maintains at least one rotating log. These logs can be queried after an attack for pieces of data to comply with a pattern. The size of the logs may limit the maximum time over which a pattern can be applied. If the system requires events over an entire day to be analyzed, the logs will have to be sufficient to store an entire day's worth of events.

An agent manager 104 collects the reported data and looks for patterns in the events as the data is received. These patterns can take many forms. In one embodiment, the pattern includes an event of type A and an event of type B. In another embodiment, the pattern includes an event of type A followed by an event of type B. For example, when agents are asked to report on supporting events, the agents can be specifically asked for supporting events that either occurred prior to a triggering event or subsequent to a triggering event.

In yet another embodiment, the pattern includes more than n distinct events of type A, where the criteria for "distinct" is selectable. For example, Event A(x) occurs n times within a window of time. This pattern requires the system to count events. Alternatively, Event $A(x_1) \ldots A(x_n)$ occur within a window of time, and no $x_i = x_j$ unless i=j. This pattern requires the system maintain a list of past events to ensure that new events will only be counted if they are distinct from each of the previous events.

In yet another embodiment, the agent manager 104 queries the agents for supporting events in order of increasing frequency of occurrence. Once the least common event is found, only the second least common event is sought. Once the second least common event is found, the third least common event is sought, and so on.

In yet another embodiment, events can be divided into common and uncommon. All of the uncommon events then become potential triggering events. After the agent manager collects all of the triggering events from the agents, the agent manager requests supporting events.

In yet another embodiment, a stochastic approach can be used to form a pattern. For example, agents report one in every ten probing events to the central server. Based on the configuration of the agents, the agent manager can compute the probability that an attack would be detected.

Figure 3:
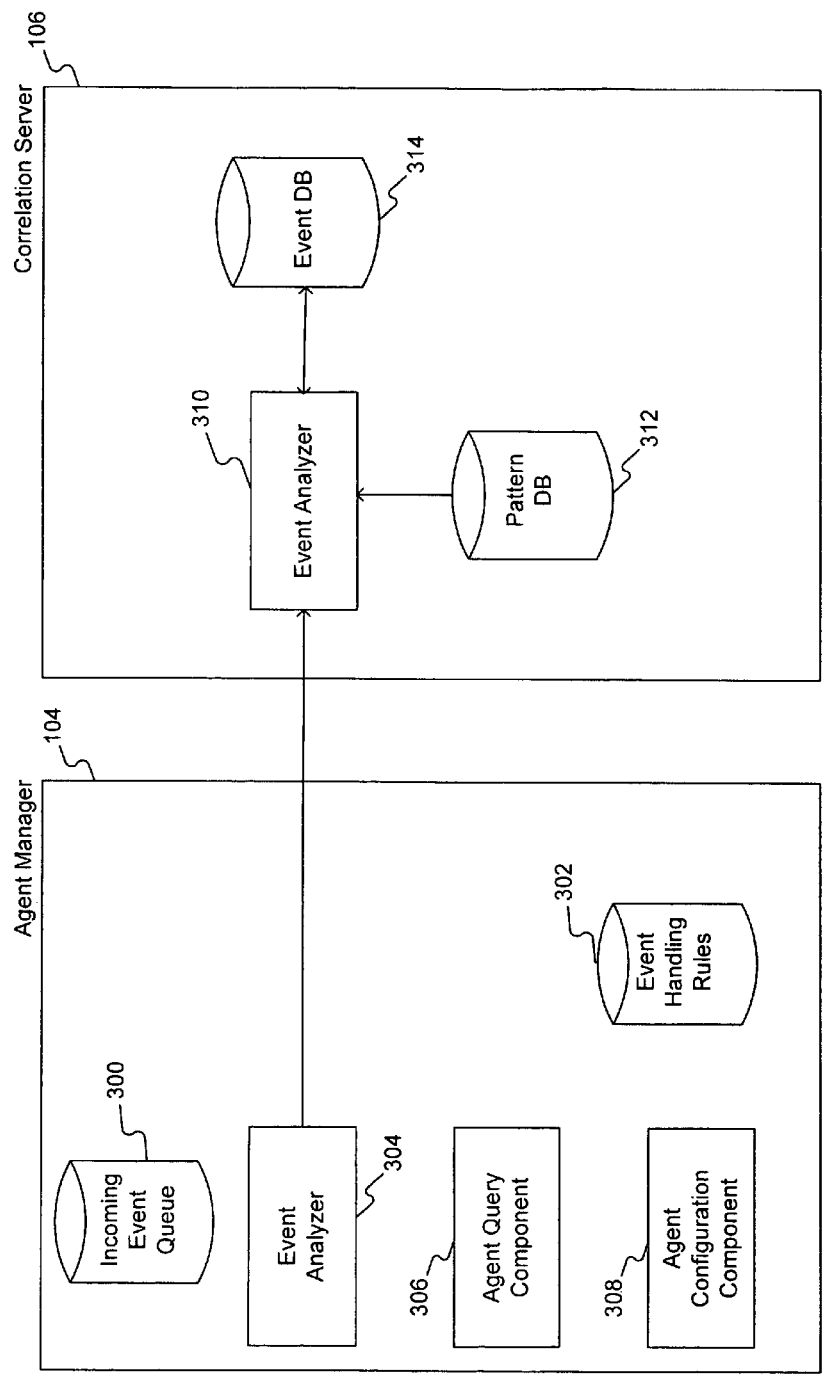
FIG. 3 is a diagram of the agent manager and correlation server components within a security event correlation system according to the implementation of the present invention.

FIG. 3 is a diagram of the agent manager 104 and correlation server 106. An agent manager 104 may include an incoming event queue 300, an event handling rules database 302, an event analyzer 304, an agent query component 306, and an agent configuration component 308. The event handling rules database 302 may store queries for data when the data is needed to complete a pattern of interest. In one embodiment, the event handling rules database 302 can store requests already sent to agents or potential requests for agents. The event queue 300 stores events received from agents. The event analyzer 304 looks at the events received from agents and may determine whether the events constitute a triggering event, as stored in the event handling rules database 302. The agent query component 306 sends the requests from the event handling rules database 302 to the agents. In one instantiation, the query component 306 updates the event handling rules database 302 to reflect the outstanding query. The agent configuration component 308 configures agents based on collection rules. For example, the collection rules may instruct the agent to collect information related to probes of a network, when those probes occur more often than a predetermined frequency within a window of time. The collection rules may be adjustable.

A correlation server 106 may include a pattern database 312, an event analyzer 310, and an event database 314. The event analyzer 310 may look at the events received from agents or from the agent manager, store those events in the event database 314, and determine whether those events match any of the patterns stored in the pattern database 312. The agent configuration component 308 can use the patterns in pattern database 312 to create event handling rules 302.

Figure 4A:
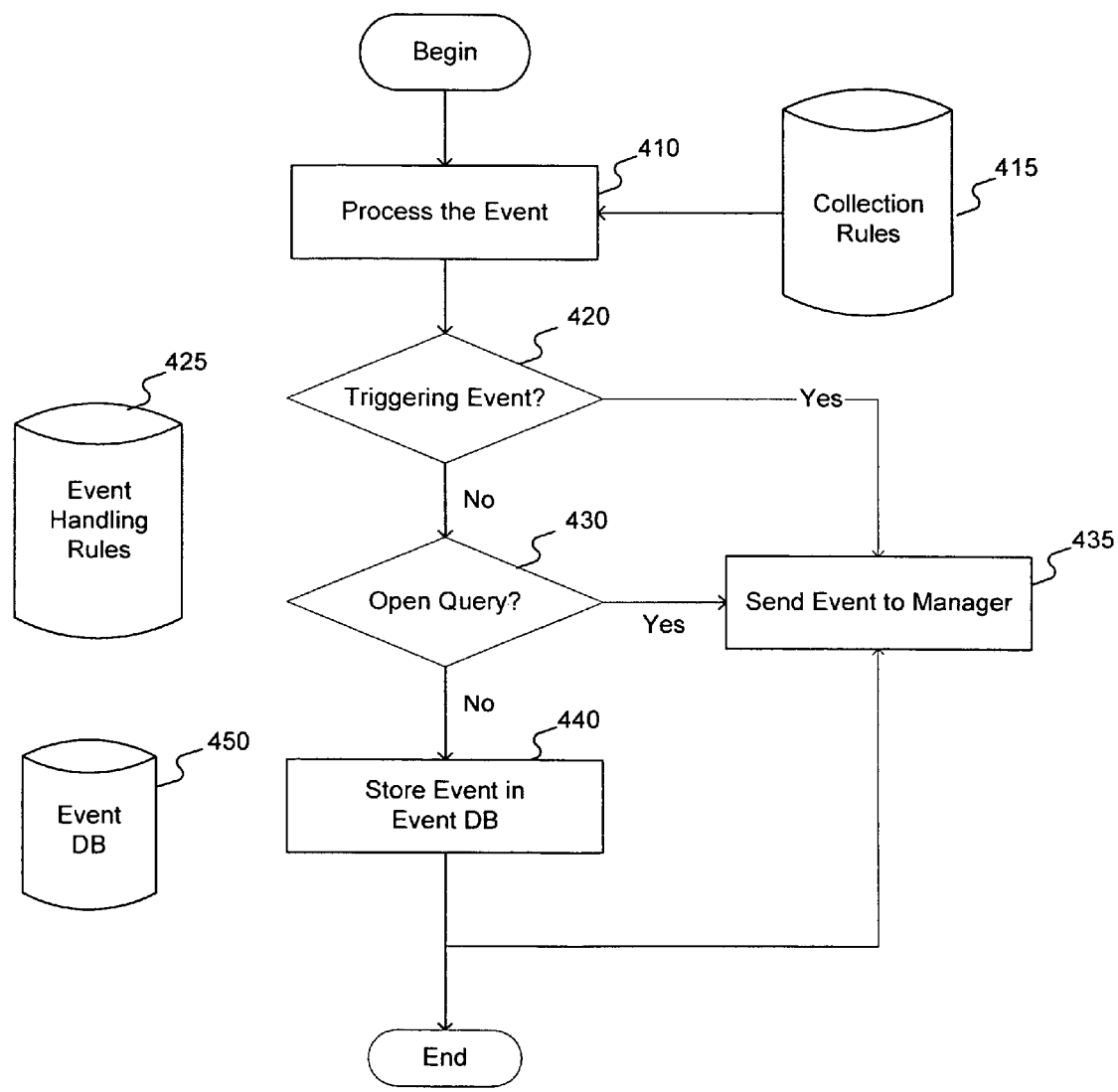
FIGS. 4A-4B are flow diagrams of the steps performed by an agent to monitor, collect, and transmit information concerning events according to the implementation of the present invention.
Figure 4B:
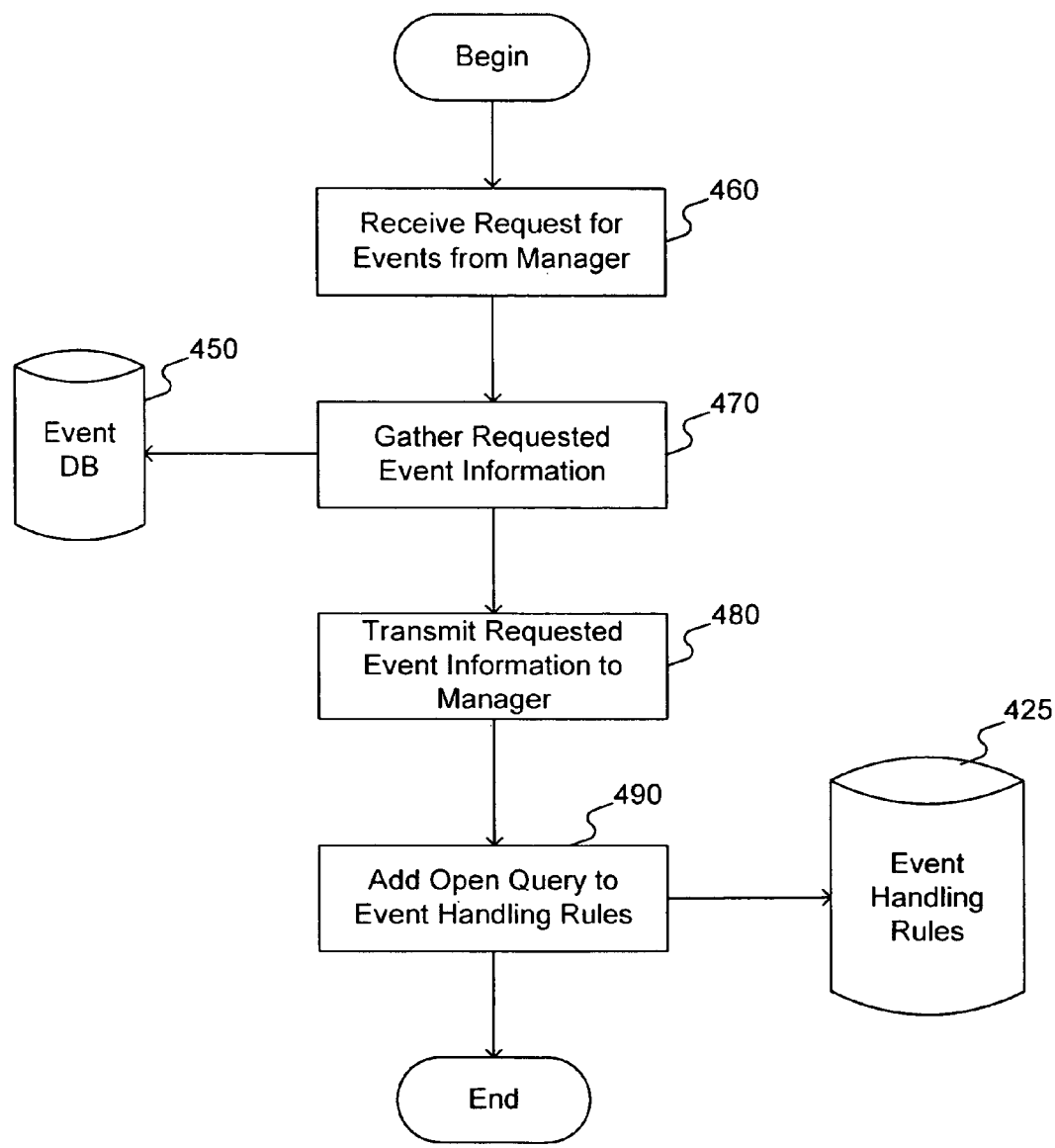

An agent performs the steps of procedures 400 and 402 illustrated in FIG. 4A and FIG. 4B. The agent manager performs the steps of procedure 500 illustrated in FIG. 5. The correlation sever performs the steps of procedure 600 illustrated in FIG. 6.

FIG. 4 has two parts. FIG. 4A is a flow diagram of the procedure 400 that the agent uses to monitor at least one event. Based on the adjustable collection rules 415, an agent monitors one or more security devices. For example, an agent may monitor a network for signs of a network attack, such as probes of a network occurring more often than a predetermined frequency within a window of time. The agent normalizes and filters event information based on the adjustable collection rules 415 (step 410). Collected event information may include any data related to the security devices monitored by each agent. For instance, event information may include the address of any remote machine that accesses a network, and the frequency of access from each machine.

The agent references the event handling rules database 425 to determine whether the event is a triggering event that must be reported immediately (step 420). If the event is a triggering event, the event is immediately forwarded to the agent manager (step 435).

The agent references the event handling rules database 425 to determine whether the event represents supporting evidence for an open query (step 430). If an open query applies to that event, the event is immediately forwarded to the agent manager (step 435).

The agent stores the collected event information in an event database 450 (step 440). When required, the agent makes the selected event information available to the agent manager (step 435). Selected event information may include any data the agent was configured to select based on the pattern, such as the address of a remote machine that may represent the source of a network attack.

The agent also handles requests from the agent manager. FIG. 4B is a flow diagram of the procedure 402 that the agent uses to handle requests from the agent manager. The agent receives one or more requests from the agent manager (step 460). These requests may specify a pattern of events and a time frame. By including a time frame that has passed, the query can represent a request for historical event data. Specifying a time frame that has not finished can represent a request that future events be immediately forwarded. By specifying an open-ended frame of time, the query can represent a permanent reconfiguration requirement.

The agent gathers requested event information based on the request from the agent manager (step 470). The agent gathers the requested event information from the event database 450, and transmits the requested event information to the agent manager (step 480).

If the query is not entirely historical in nature, it may be added to the event handling rules database 425 (step 490) to ensure that future matching events are forwarded as they are encountered.

Figure 5:
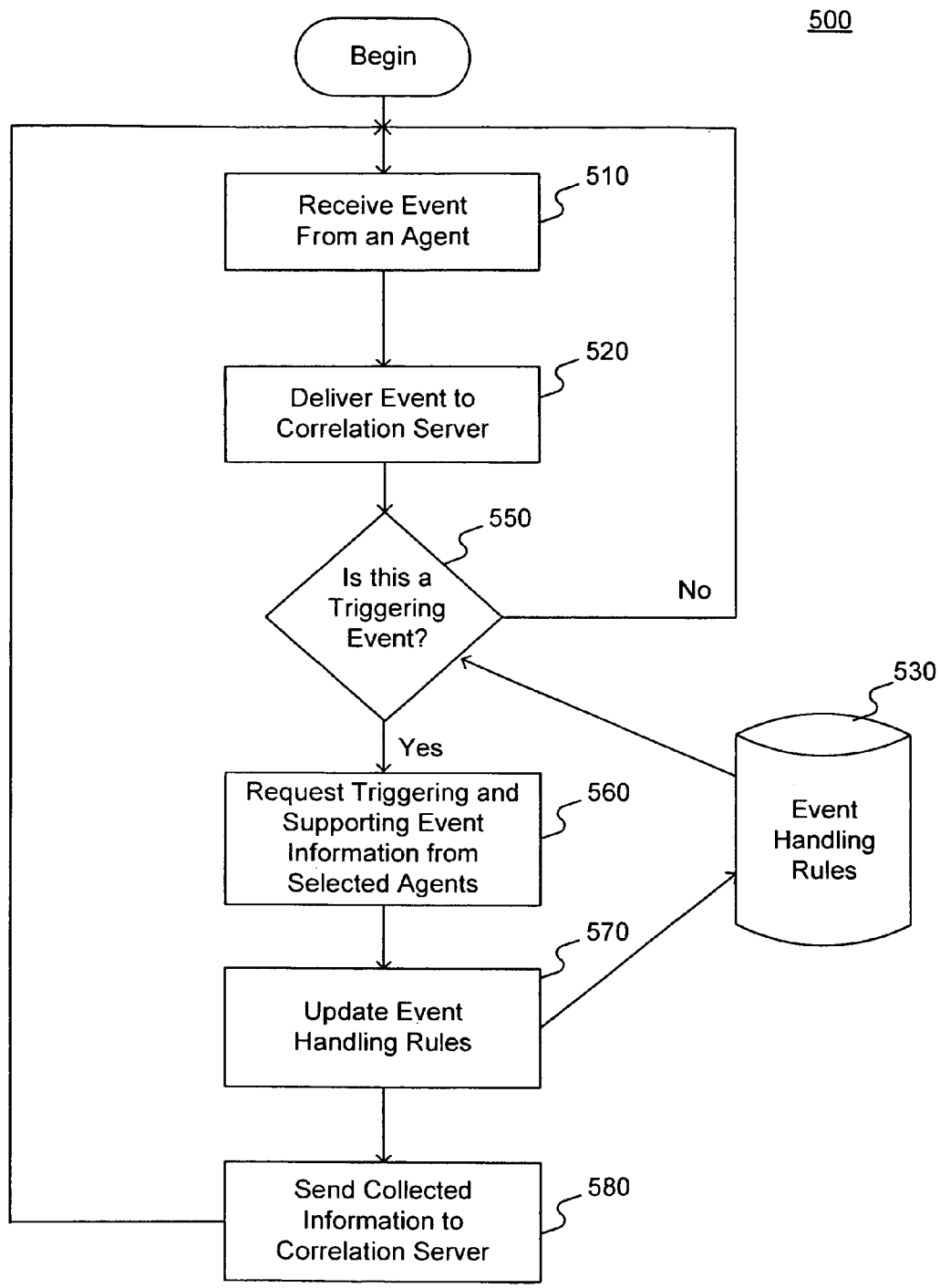
FIG. 5 is a flow diagram of the steps performed by an agent manager to process, analyze, and request event information according to the implementation of the present invention.

FIG. 5 is a flow diagram of the procedure 500 that the agent manager uses to handle each individual incoming event received from an agent. First, the agent manager receives event information from an agent (step 510). The agent manager delivers this event information (step 520) to the correlation server.

The agent manager then applies rules to the event (as defined in the event handling rules database 530) to determine if the event represents a triggering event (step 550).

If the event is a triggering event, the agent manager requests triggering event and supporting event information from selected agents that are a potential source of the triggering event or supporting events (step 560). The agents are informed of the pattern associated with the triggering event, the time of the triggering event, and a timeout window. If a triggering event is not present, the agent manager continues to receive events from agents.

In one embodiment, the agents access the event database 450 in FIG. 4B for any supporting events that comply with, or potentially comply with the pattern associated with the triggering event. For example, if the triggering event includes unauthorized, repeated network access by a remote machine, the agents may look for any additional network access by the remote machine. If the necessary supporting data is not found, the agent can establish a temporary rule to immediately forward any supporting events that comply with or potentially comply with the pattern. This temporary rule is automatically dropped when the timeout window is reached.

When the agent manager has the necessary event information, the agent manager sends the collected event information to the correlation server (step 570). The agent manager continues to receive event information from agents. If a triggering event is received while the timeout window from another triggering event is open, the agent manager will simply make additional requests of supporting events from the agents. In one embodiment, the agents maintain a list of prior requests that have already been fulfilled, and only deliver events that have not already been forwarded (step 570).

In one embodiment, the agent manager does not have to collect the query results and deliver them to the correlation server (step 580). Instead, the agents return the results of the queries as if the events were happening in real-time. The agent manager will receive the events, forward them to the correlation server and perform only that processing that is required by the updated handling rules.

Figure 6:
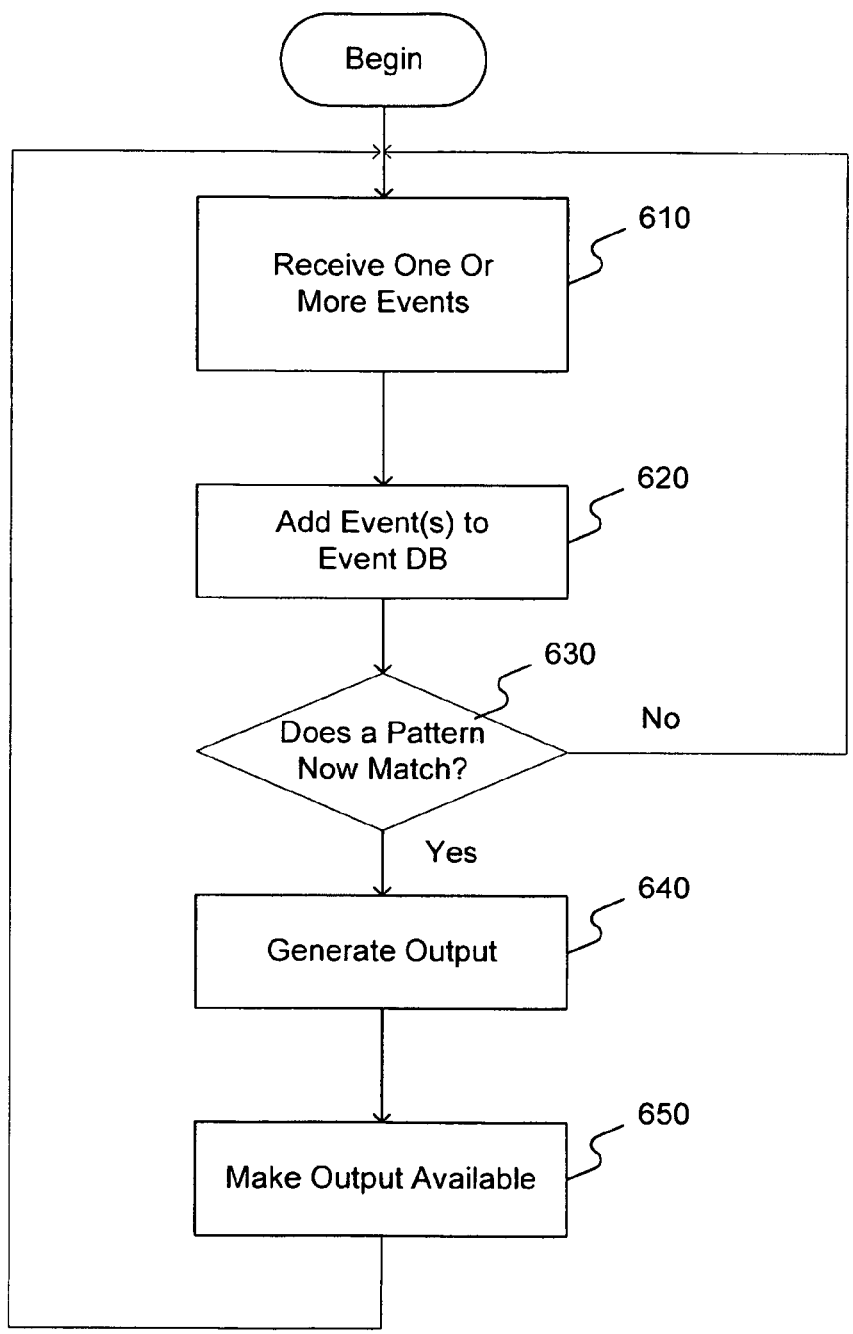
FIG. 6 is a flow diagram of the steps performed by a correlation server to process event information according to the implementation of the present invention.

FIG. 6 is a flow diagram of the procedure 600 that the correlation server uses to analyze incoming events. First, the correlation server receives triggering event and supporting event information from the agent manager (step 610). The correlation server updates its event database containing either raw events or partial pattern matches (step 620). The correlation server analyzes the events to determine if a correlation pattern matches (step 630). If a match is found, the correlation server generates output (step 640) and makes the output available (step 650). For example, the correlation server may alert an administrator, or instruct a network to block access from a designated remote machine.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A computer-implemented method of monitoring events in a network, comprising:
    monitoring activities received over the network associated with a node located remotely over the network;
    collecting event information associated with the monitored activities and based on a set of collection rules, the collection rules specifying a set of patterns associated with a triggering event and a timeout window for collection of the event information, the event information being stored in a database;

determining whether a portion of the collected event information stored in the database complies or potentially complies with one of the set of patterns and is considered a supporting event of the triggering event;

selecting event information as supporting events from the collected event information stored in the database based on the determination, and if none of the collected event information is found to be a supporting event, establishing a temporary rule to forward any future supporting events that comply with or potentially comply with one of the set of patterns; and sending the selected event information and future supporting events to a manager associated with the node and other nodes over the network;

wherein the temporary rule is automatically removed when the timeout window has elapsed.

2. The method of claim 1, wherein the selecting step includes the substep of:

examining rotating backlogs for supporting events.

3. A computer system for monitoring events in a network, the system comprising:

an event monitor configured to monitor activities associated with a node;

an event collector configured to collect event information associated with the monitored activities and based on a set of collection rules, the collection rules specifying a set of patterns associated with a triggering event and a timeout window for collection of the event information;

an event selector configured to determine whether a portion of the collected event information complies or potentially complies with one of the set of patterns and is considered a supporting event of the triggering event and select event information as supporting events from the collection based on the determination, and if none of the collected event information is found to be a supporting event, establish a temporary rule to forward any future supporting events that comply with or potentially comply with one of the set of patterns; and an event transmitter configured to make the selected event information and future supporting events available to a manager associated with the node and other nodes in the network;

wherein the temporary rule is automatically removed when the timeout window has elapsed.

4. The system of claim 3, wherein the event transmitter sends requested event information in response to a request from a manager.

5. The system of claim 3, wherein the event selector examines rotating backlogs for supporting events.

6. A computer system for monitoring events in a network, the system comprising:

a set of agents, each of which:

monitors activities associated with a node, determines whether a portion of collected event information complies or potentially complies with one of a set of stored patterns and is considered a supporting event of a triggering event, and selects event information as supporting events from the collection based on the determination, and if none of the collected event information is found to be a supporting event, establishes a temporary rule to forward any future supporting events that comply with or potentially comply with one of the set of patterns; and a manager that:

receives event information from each of the set of agents, identifies a triggering event based on the received event information, wherein the triggering event is an event with the least likelihood of occurrence from among the events in a network, and sends at least one request for supporting event information of the triggering event to a selected agent when a triggering event is identified.

7. A non-transitory computer-readable medium including instructions for performing a method for monitoring events in a network, the method comprising:

monitoring activities associated with a node;

collecting event information associated with the monitored activities and based on a set of collection rules, the collection rules specifying a set of patterns associated with a triggering event and a timeout window for collection of the event information;

determining whether a portion of the collected event information complies or potentially complies with one of the set of patterns and is considered a supporting event of the triggering event;

selecting event information as supporting events from the collected event information based on the determination, and if none of the collected event information is found to be a supporting event, establishing a temporary rule to forward any future supporting events that comply with or potentially comply with one of the set of patterns; and making the selected event information and future supporting events available to a manager associated with the node and other nodes in the network;

wherein the temporary rule is automatically removed when the timeout window has elapsed.

8. The computer-readable medium of claim 7, wherein the method further includes:

sending requested event information in response to a request from a manager.

9. The computer-readable medium of claim 7, wherein the selecting step includes the substep of:

examining rotating backlogs for supporting events.

* * * * *